United States Patent

Ando

(10) Patent No.: US 10,513,001 B2
(45) Date of Patent: Dec. 24, 2019

(54) BEARING DIAGNOSTIC DEVICE

(71) Applicant: Okuma Corporation, Niwa-Gun (JP)

(72) Inventor: Tomoharu Ando, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 318 days.

(21) Appl. No.: 15/643,871

(22) Filed: Jul. 7, 2017

(65) Prior Publication Data

US 2018/0043492 A1 Feb. 15, 2018

(30) Foreign Application Priority Data

Aug. 9, 2016 (JP) ................................. 2016-156773

(51) Int. Cl.
  *B23Q 17/00* (2006.01)
  *B23Q 17/12* (2006.01)
  *G01M 13/045* (2019.01)

(52) U.S. Cl.
  CPC ........... *B23Q 17/007* (2013.01); *B23Q 17/12* (2013.01); *G01M 13/045* (2013.01); *F16C 2233/00* (2013.01); *F16C 2322/39* (2013.01)

(58) Field of Classification Search
  None
  See application file for complete search history.

(56) References Cited

U.S. PATENT DOCUMENTS

| 7,340,416 | B1 * | 3/2008 | Larabee | G06Q 10/0631 |
| | | | | 705/7.12 |
| 2002/0188703 | A1 * | 12/2002 | Alden | H04L 29/06 |
| | | | | 709/220 |
| 2005/0155429 | A1 * | 7/2005 | Griessler | G01M 13/045 |
| | | | | 73/593 |
| 2008/0288533 | A1 * | 11/2008 | Seubert | G06F 9/4488 |
| 2019/0064033 | A1 * | 2/2019 | Oohara | G01M 13/045 |

FOREIGN PATENT DOCUMENTS

| JP | 06-65189 B2 | 8/1994 |
| JP | 3170076 B2 | 5/2001 |

* cited by examiner

*Primary Examiner* — Tung S Lau
(74) *Attorney, Agent, or Firm* — Burr & Brown, PLLC

(57) ABSTRACT

A bearing diagnostic device includes an identification unit and an obtaining unit. The identification unit is configured such that a feature quantity, an operation condition of a main spindle at a measurement of the feature quantity, and specification data of the bearing used for the main spindle are preliminarily configured as inputs. The identification unit is configured such that a normal state and an abnormal state are preliminarily configured as outputs. The identification unit is configured to create an identification model through machine learning. The obtaining unit is configured to obtain the feature quantity, the operation condition at the measurement of the feature quantity, and the specification data of the bearing used for the main spindle.

5 Claims, 2 Drawing Sheets

BEARING DIAGNOSTIC DEVICE

BACKGROUND

This application claims the benefit of Japanese Patent Application Number 2016-156773 filed on Aug. 9, 2016, the entirety of which is incorporated by reference.

TECHNICAL FIELD

The disclosure relates to a bearing diagnostic device for identifying a state of a rolling bearing that supports a main spindle of a machine tool or a similar component.

RELATED ART

A rolling bearing is used for, for example, a rotation device for many machines and is generally used for a main spindle of a machine tool. A retainer, which serves to maintain rolling elements of the bearing at regular intervals, generates slipperiness with the rolling elements and therefore lubricating oil is required to maintain an operation of the retainer normal. There has been provided a supply method of lubricating oil that uses grease, a method referred to as an "oil air," which sends fine lubricating oil discharged from a mixing valve into the bearing by compressed air, and a similar method. In case of an operational failure of the mixing valve, the lubricating oil becomes insufficient, resulting in barking of the retainer and the rolling elements, which causes the main spindle to be unrotatable. Since the production stops while the bearing for the main spindle is exchanged, a state of the rolling bearing for the main spindle needs to be grasped.

There has been known an analysis method to grasp the state of the rolling bearing that performs an inertial rotation on a rotator and calculates a frictional torque. Japanese Examined Patent Application Publication No. 6-65189 discloses that a ratio of a change in rotation speed to a time change during an inertial rotation of a shaft is converted into a frictional torque of a bearing and that the torque is compared with a determination reference value to determine a level of abnormality of the bearing.

Meanwhile, a method using vibrations is also often employed for abnormality diagnosis of the bearing. Japanese Patent No. 3170076 discloses that a Fourier spectrum of an envelope in an oscillatory waveform detected by a vibration sensor is obtained and a connection state of a neural network is obtained through machine learning to determine the abnormality. The connection state of a neural network is constituted of an input layer, which inputs information obtained based on the spectrum, an intermediate layer, and an output layer, which outputs presence/absence of a failure in a rolling bearing and a state of the failure, each having a plurality of neurons.

Generally, the frictional torque at each rotation speed is significantly changed by a preload of the rolling bearing, lubricating oil viscosity, a temperature affecting both, an amount of supplied oil, and a state of a rolling surface. The preload of the bearing and the lubricating oil viscosity significantly change depending on the temperature at which the bearing is used. Therefore, it is difficult to configure a life determination line as described in Japanese Examined Patent Application Publication No. 6-65189 to be a constant fixed value. Further, the main spindles have many specifications of different main spindle diameters and motor outputs, and the life determination line differs depending on the main spindle specifications. Accordingly, the life determination line needs to be set for each specification of a main spindle device. The other method which is the diagnosis of the rolling bearing using the vibrations, similar to the frictional torque, needs to set, for example, a filter and parameters for envelope process according to the bearing specifications, a maximum rotation speed, and a similar specification, which differ depending on the main spindle device. Therefore, Japanese Patent No. 3170076 discloses that an identification model is created with the neural network and whether the state is normal or abnormal is identified to eliminate the need for settings such as the filter and the parameters for envelope process according to the bearing different depending on the main spindle device. It is important for such identification model how to select an input such that a percentage of correct answers becomes close to 100%.

Therefore, the disclosure has been made in view of the above-described problems, and it is to provide a bearing diagnostic device that improves a percentage of correct answers for identification related to a bearing diagnosis compared with a conventional device.

SUMMARY

In order to achieve the above-described object, there is provided a bearing diagnostic device according to a first aspect of the disclosure. The bearing diagnostic device in a machine tool detects a bearing failure in a main spindle device journaled to a rolling bearing. The bearing diagnostic device includes an identification unit and an obtaining unit. The identification unit is configured such that a feature quantity, an operation condition of a main spindle at a measurement of the feature quantity, and specification data of the bearing used for the main spindle are preliminarily configured as inputs. The feature quantity indicates a state of the rolling bearing of the main spindle device in a normal or an abnormal. The identification unit is configured such that a normal state and an abnormal state are preliminarily configured as outputs. The identification unit is configured to create an identification model through machine learning to identify whether the main spindle device is in the normal state or the abnormal state using the created identification model. The obtaining unit is configured to obtain the feature quantity, the operation condition at the measurement of the feature quantity, and the specification data of the bearing used for the main spindle. The feature quantity indicates the state of the rolling bearing of the diagnosed main spindle device in operation. The obtained feature quantity indicative of the state of the bearing, operation condition at the measurement of the feature quantity, and bearing specification data used for the main spindle may be input to the identification unit to identify whether the bearing is in the normal state or the abnormal state.

With the bearing diagnostic device according to a second aspect of the disclosure, which is in the first aspect of the disclosure, the feature quantity indicative of the state of the rolling bearing may be a time series variation of a rotation speed by an inertial motion, a frictional torque at each rotation speed calculated by multiplying a difference between the rotation speeds in unit time by an inertia moment of a rotator, or both. The operation condition may be any one of the rotation speeds when the inertial motion starts and ends, a temperature of a structure affected by an inertial operation, a temperature that affects the bearing, or a supply state of a bearing lubricating oil, or a combination of the above-mentioned conditions. The bearing specification data may be a ball pitch diameter, a maximum rotation speed, or both.

With the bearing diagnostic device according to a third aspect of the disclosure, which is in the first aspect of the disclosure, the feature quantity indicative of the state of the rolling bearing may be a vibration value at each vibration frequency on which a frequency analysis has been performed. The operation condition may be a rotation speed at which the vibration is measured. The bearing specification data may be a ball pitch diameter, a rolling element diameter, the number of rolling elements, a contact angle, a maximum rotation speed, or a combination of the above-mentioned specification data.

With the bearing diagnostic device according to a fourth aspect of the disclosure, which is in the first aspect of the disclosure, the abnormal state to create the identification model may be learned as any one of a poor lubrication, a preload failure, a flaw of a rolling surface, a damage of a retainer, or main spindle bending, or a combination of the above-mentioned states.

With the bearing diagnostic device according to a fifth aspect of the disclosure, which is in the second aspect of the disclosure, the time series variation of the rotation speed by the inertial motion as the feature quantity indicative of the state of the rolling bearing may be normalized by time. The frictional torque at each rotation speed calculated by multiplying the difference between the rotation speeds in the unit time by the inertia moment of the rotator may be normalized by the rotation speed.

With the embodiments, the condition when the feature quantity is measured and which affects the feature quantity is configured as the input together with the feature quantity. For example, when the feature quantity is the frictional torque, the supply state of the lubricating oil and the bearing temperature as the condition are the inputs together with the frictional torque. Accordingly, even if the type of the rolling bearing used for the main spindle device differs depending on the specification of the main spindle device, the one highly accurate identification model for abnormal and normally can handle. Since there is no need to change the identification model according to the specification of the main spindle and select the filter according to the input for the identification, anyone can easily diagnose the rolling bearing. Since the input to the identification model is configured as the frictional torque obtained from the inertial operation, the need for the use of a special sensor is eliminated. Therefore, the diagnosis for the rolling bearing at a low price is achieved. Furthermore, since the cause of the abnormality is also learned as the output of the identification model, both the abnormality and the cause of the abnormality can be determined. The above configuration ensures quick handling for the abnormality, shortens a time until restoration of the main spindle device, and can prevent the recurrence.

DETAILED DESCRIPTION

The following describes the disclosure embodied for a rolling bearing of a main spindle device of a machine tool having a configuration that obtains a frictional torque as feature quantities of the rolling bearing in an inertial motion to identify whether the rolling bearing is normal or abnormal with reference to the drawings.

Figure 1:
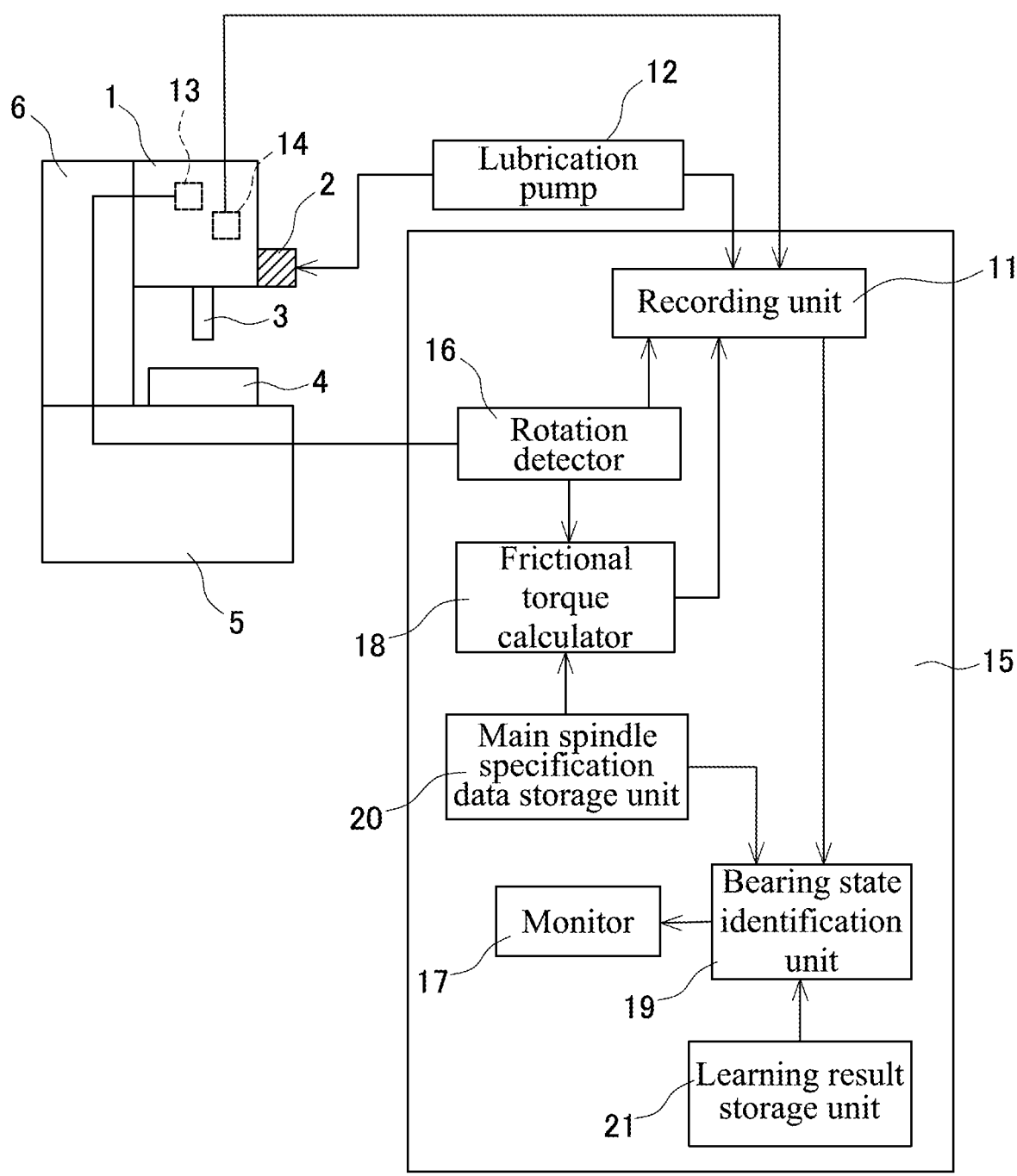
FIG. 1 is a block configuration diagram of an NC device that includes a classifying device of a state of a rolling bearing.

FIG. 1 is a block configuration diagram illustrating one example of an NC machine tool that includes a main spindle bearing diagnostic device 15. A main spindle 3, which is provided in a main spindle housing 1 so as to be rotatable by a main spindle motor (not illustrated), is supported by a rolling bearing (not illustrated). The main spindle housing 1 is movable with respect to a column 6 by a ball screw and a feed axis motor (not illustrated). Similarly, a table 4 is also movable with respect to a bed 5 by the ball screw and the feed axis motor (not illustrated). A workpiece is mounted on the table 4, and the table 4 and the main spindle 3 are relatively moved to process the workpiece with a cutting tool attached to the main spindle 3.

A temperature sensor 14 as means to detect a temperature of the rolling bearing and a main spindle rotation detector 13 and a rotation detector 16 as means to calculate a main spindle rotation speed are provided. As means to supply lubricating oil to a main spindle bearing, a lubrication pump 12 and a mixing valve 2, which discharges a slight capacity of lubricating oil to supply the bearing with the lubricating oil by compressed air, are mounted to the main spindle housing 1.

When an inertial operation is started for diagnosis of the state of the main spindle 3, a recording unit 11 records a velocity when the inertial motion starts and a rotation speed during the inertial motion at constant intervals. The embodiment assumes that the recording ends when the inertial rotation stops. The recorded rotation speed during the inertial motion is transmitted to a frictional torque calculator 18 to calculate a frictional torque at each rotation speed using an inertia moment of the main spindle 3 transmitted from a main spindle specification data storage unit 20 and an amount of change in rotation speed. The calculated frictional torque at each rotation speed is normalized by a maximum rotation speed, is resampled into a predetermined point n, and is transmitted to the recording unit 11. Additionally, an operating status of the lubrication pump 12 such as whether the lubrication pump 12 operates during the inertial motion, and in what time intervals by minute the lubrication pump operates, and a main spindle temperature by the temperature sensor 14 are transferred to the recording unit 11.

Figure 2:
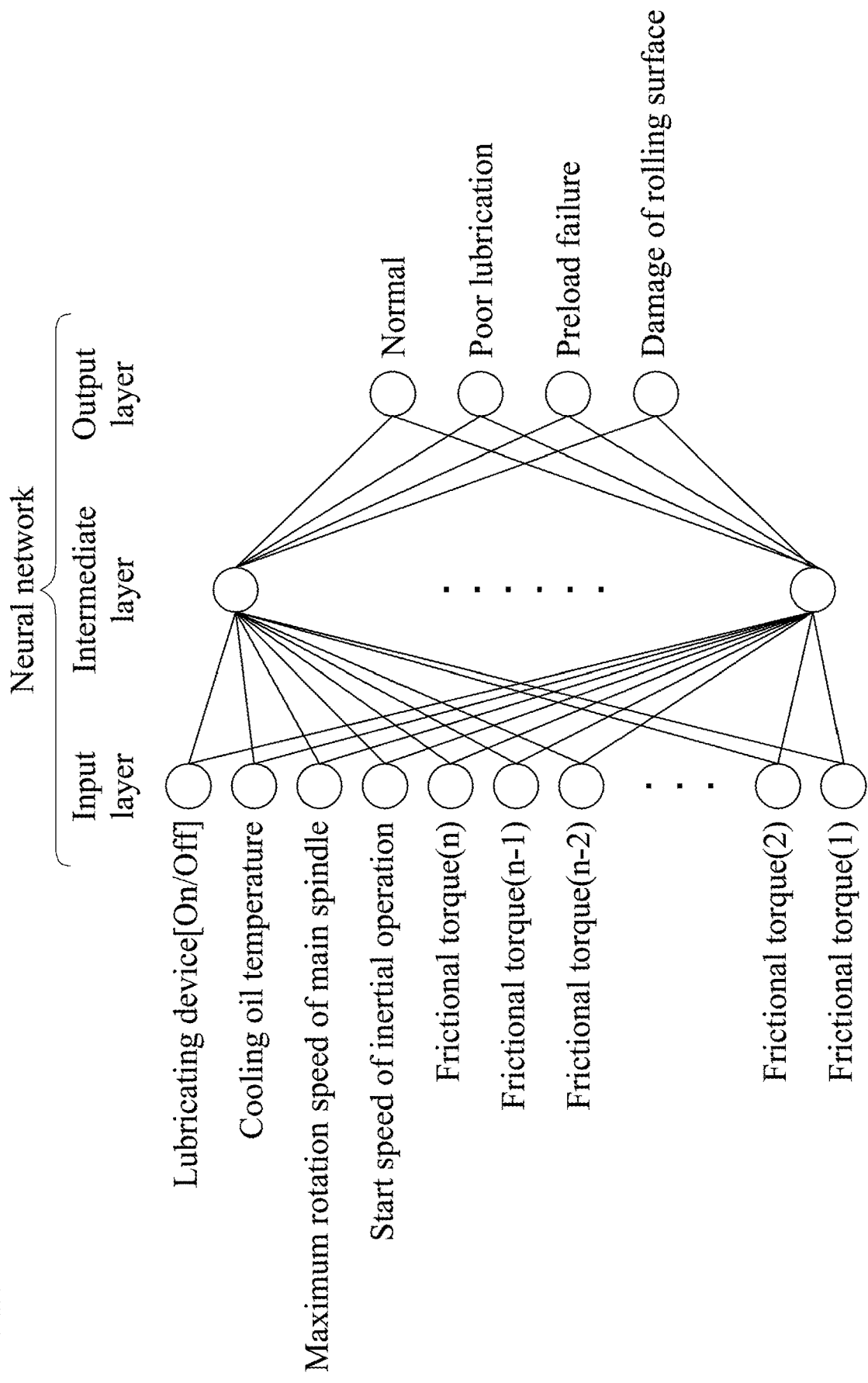
FIG. 2 is an explanatory view representing an inside of a classifying device.

As illustrated in FIG. 2, a bearing state identification unit 19 is constituted of a neural network. An input layer receives the normalized frictional torque at each velocity, the start speed of the inertial operation, and the bearing temperature during the inertial motion from the recording unit 11. The main spindle specification data storage unit 20 inputs the maximum rotation speed used for the main spindle 3 together. The frictional torques at each rotation speed during poor lubrication, preload failure, and damage of rolling surface normalized by the maximum rotation speed, whether the lubrication pump 12 has been operated during the inertial motion, and the main spindle temperature are configured as inputs. The normal state and the poor lubrication, the preload failure, and the damage of the rolling surface as the abnormal state are configured as the outputs. Then, the learning is preliminarily performed using the neural network and the learning result is stored (in a learning result storage unit 21). Whether the bearing is normal or abnormal is identified with an identification model created here through the learning. If the bearing is identified as abnormal, the abnormality is determined to be any one of the poor lubrication, the preload failure, and the damage of the rolling surface. A monitor 17 displays the identification result.

As described above, the frictional torque of the rolling bearing is substantially affected by the start rotation speed of the inertial operation, the lubricating oil supply conditions, and the bearing temperature. For example, with the main spindle device with a plurality of specifications, when the bearing diagnostic device was caused to learn the frictional torque during normal and abnormal and the start speed of the inertial operation as the inputs and the normal and abnormal as the outputs, the percentage of correct answers was 87.3%. When the presence/absence of supply of the lubricating oil was added to the input, the percentage of correct answers was increased to 90.7%. Further, when a temperature of cooling oil, which is used to cool the bearing, was added to the input, the percentage of correct answers was increased to 91.2%.

In the embodiment, the start rotation speed of the inertial operation, the presence/absence of supply of the lubricating oil, and the bearing temperature are added as the inputs to the identification model in addition to the frictional torque. However, a preload measured for confirmation during the assembly, an end velocity of the inertial rotation, and specification data of the bearing (a diameter of a ball pitch circle, the number of balls, and a contact angle) may be configured as the inputs. Furthermore, not only the presence/absence of supply of the lubricating oil but a supply interval of the lubricating oil may be used. With a main spindle device constituted of a plurality of types of bearings, all specification data of the used bearings may be added, or when there are plural identical bearings, the number of the used bearings may be added. Whether the main spindle is stood for use, disposed sideways for use, or used as a pivot shaft may be configured as the input. The example where the frictional torque is normalized by the rotation speed so that the main spindle device at the various rotation speeds is configured to use the one identification model is described above. However, the identification models may be created depending on the specifications of the main spindle device. There may be a case where, not from the maximum rotation speed of the inertial motion until the rotation stop, but the change in rotation speed is measured a plurality of times at any given rotation speeds. In this case, the speeds at the start and the end of the measurement may be configured as the inputs. A composite cause such as the poor lubrication and the preload failure may be configured as the output of the abnormal state.

Meanwhile, with a diagnostic device for the rolling bearing using the vibrations, a vibration value at each frequency produced by frequency analysis on signals from the vibration sensor, the rotation speed when the vibration is measured, and the maximum rotation speed of the main spindle, and as the bearing specification data, the ball pitch diameter, a rolling element diameter, the number of rolling elements, and the contact angle are configured as the inputs to the identification model, and the normal and as the abnormal states, the preload failure, a damage of the rolling surface, a damage of the retainer, and main spindle bending are configured as the outputs. Additionally, both the frictional torque and the vibration may be configured as the inputs. This configuration allows the classification of the abnormal state of the main spindle device such as the poor lubrication, the preload failure, a flaw of the rolling surface, the damage of the retainer, and the main spindle bending.

The identification model also can employ deep learning, not the single-layered neural network. A method to display the bearing state can employ a state indicating light constituted of LEDs with a plurality of colors as well as the display. Furthermore, not only the display indicative of the abnormal state, machine control such as a machine stop and a separation of a tool from a workpiece may be performed.

The disclosure described here is not limited to the main spindle of the machine tool but is applicable to a rotation device using a rolling bearing.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A bearing diagnostic device in a machine tool that detects a bearing failure in a main spindle device journaled to a rolling bearing, the bearing diagnostic device comprising:

an identification unit configured such that a feature quantity, an operation condition of a main spindle at a measurement of the feature quantity, and specification data of the bearing used for the main spindle are preliminarily configured as inputs, the feature quantity indicating a state of the rolling bearing of the main spindle device in a normal or an abnormal, the identification unit being configured such that a normal state and an abnormal state are preliminarily configured as outputs, the identification unit being configured to create an identification model through machine learning to identify whether the main spindle device is in the normal state or the abnormal state using the created identification model; and an obtaining unit configured to obtain the feature quantity, the operation condition at the measurement of the feature quantity, and the specification data of the bearing used for the main spindle, the feature quantity indicating the state of the rolling bearing of the diagnosed main spindle device in operation, wherein the obtained feature quantity indicative of the state of the bearing, operation condition at the measurement of the feature quantity, and bearing specification data used for the main spindle are input to the identification unit to identify whether the bearing is in the normal state or the abnormal state.

2. The bearing diagnostic device according to claim 1, wherein:

the feature quantity indicative of the state of the rolling bearing is a time series variation of a rotation speed by an inertial motion, a frictional torque at each rotation speed calculated by multiplying a difference between the rotation speeds in unit time by an inertia moment of a rotator, or both, the operation condition is any one of the rotation speeds when the inertial motion starts and ends, a temperature of a structure affected by an inertial operation, a temperature that affects the bearing, or a supply state of a bearing lubricating oil, or a combination of the conditions, and the bearing specification data is a ball pitch diameter, a maximum rotation speed, or both.

3. The bearing diagnostic device according to claim 1, wherein:

the feature quantity indicative of the state of the rolling bearing is a vibration value at each vibration frequency on which a frequency analysis has been performed, the operation condition is a rotation speed at which the vibration is measured, and the bearing specification data is a ball pitch diameter, a rolling element diameter, the number of rolling elements, a contact angle, a maximum rotation speed, or a combination of the specification data.

4. The bearing diagnostic device according to claim 1, wherein the abnormal state to create the identification model is learned as any one of a poor lubrication, a preload failure, a flaw of a rolling surface, a damage of a retainer, or main spindle bending, or a combination of the states.

5. The bearing diagnostic device according to claim 2, wherein:

the time series variation of the rotation speed by the inertial motion as the feature quantity indicative of the state of the rolling bearing is normalized by time, and the frictional torque at each rotation speed calculated by multiplying the difference between the rotation speeds in the unit time by the inertia moment of the rotator is normalized by the rotation speed.

* * * * *